Patented Apr. 25, 1933

1,906,179

UNITED STATES PATENT OFFICE

ALAN RICHARD POWELL, EMYR CONWY DAVIES, AND ARTHUR WILLIAM SCOTT, OF LONDON, ENGLAND, ASSIGNORS TO JOHNSON MATTHEY & COMPANY LIMITED, OF LONDON, ENGLAND

ALKALI METAL PLATINATES AND THEIR MANUFACTURE

No Drawing. Application filed July 27, 1932, Serial No. 625,216, and in Great Britain October 14, 1931.

This invention relates to the preparation of soluble alkali metal platinates, more especially for use in the preparation and replenishment of platinum plating baths as described in our copending application Serial No. 588,492, and has for its particular object the preparation of crystalline alkali metal platinates in a finely divided form which is readily soluble in warm water.

Alkali metal platinates having the empirical formula, $M_2PtO_3.3H_2O$ where M is an alkali metal have already been prepared by dissolution of freshly precipitated hydrated platinum dioxide, $PtO_2.4H_2O$, in solutions of alkali metal hydroxides and evaporation over sulphuric acid. The compounds obtained in this way are in the form of golden-yellow crystalline crusts which do not readily dissolve again in water or dilute alkali metal hydroxide solutions. Similar crystalline crusts are obtained by boiling down a solution of an alkali metal chloroplatinate in an excess of alkali metal hydroxide solution. The crystals obtained by either of these two methods have been formulated as salts of hexahydroxyplatinic acid, $H_2Pt(OH)_6$, the sodium salt having the formula $Na_2Pt(OH)_6$, and the potassium salt the formula $K_2Pt(OH)_6$; neither salt loses water when heated at 100° centigrade.

We have now found that salts containing more water than corresponds with the above-mentioned hexahydroxyplatinates are produced by adding to the cold dilute solution obtained by boiling an alkali metal chloroplatinate with an alkali metal hydroxide solution in excess a relatively large proportion of an organic liquid which is completely or almost completely miscible with water and which has practically no solvent action on alkali metal hexahydroxyplatinates. Examples of such liquids are the lower aliphatic alcohols, ketones and glycols, for example, methanol or ethanol, acetone and ethylene glycol. All these liquids are miscible with water in all proportions and having no solvent action on the alkali metal platinate, they cause precipitation of the salt in a finely divided, crystalline form containing more water (probably as water of crystallization) than corresponds with the formula $M_2Pt(OH)_6$. On drying at 100° to 110° centigrade the salts become anhydrous and are then less readily soluble in water so that we prefer to dry them at a low temperature, for example from 30° to 40° centigrade in the air. The exact content of water of crystallization depends on the method employed in precipitation and may vary from three molecules to one-half a molecule per molecule of salt. When precipitated by addition of an equal volume of ethanol to a 4 to 5 per cent solution of the alkali metal platinate the salt contains 3 molecules of water of crystallization but after washing with 95 per cent industrial ethanol, then with acetone, only 0.5 molecule of water of crystallization per molecule of salt remains.

The method of preparation of these salts may be more clearly understood by reference to the following example, although we do not limit ourselves to this procedure. Any procedure chemically equivalent will yield an equally satisfactory result. Obviously sodium hydroxide may be replaced by any other alkali metal hydroxide to obtain the corresponding alkali metal hexahydroxyplatinate and the chloroplatinate may be replaced by any other salt of tetravalent platinum other than those in which the platinum exists as a cyanide, nitrite, or ammonia complex.

Example 100 ounces of sodium chloroplatinate ($Na_2PtCl_6.6H_2O$) are dissolved in 2 gallons of hot water and added to 3 gallons of hot water containing 15 ounces of sodium hydroxide, and to the hot solution is added 135 ounces of sodium hydroxide in solid form. The solution boils vigorously so that cold water must be added as required to keep the boiling under control. When all the sodium hydroxide is dissolved, the solution is diluted to 15 gallons with hot water and boiling is continued for 3 to 4 hours, until the color of the liquid changes from orange to a pale yellow. The solution is then cooled to 20° centigrade, and 10 to 15 gallons of industrial ethanol are added with constant stirring, whereby a finely crystalline pale yellow precipitate of the sodium hexahydroxyplatinate is obtained. After the precipitate has settled the clear liquor is siphoned off and the crystals collected on a vacuum filter, washed with a mixture of equal volumes of ethanol and water, then with ethanol alone and finally with acetone. The crystals are then dried in a current of air at a temperature preferably not exceeding 40° centigrade, until a fine crystalline powder is obtained. Under the above conditions about 88 ounces of the salt will be obtained containing 55.4 per cent of platinum and representing about 94 per cent of the platinum used in the manufacture.

When the salts are intended for use in the preparation or replenishment of platinum plating baths it is essential to prevent contamination by silica during their manufacture and hence we prefer to work in tanks made of, or lined with, a metal which is not attacked or corroded by the alkaline platinum solution. Such metals comprise silver, nickel and alloys with a high content of these metals, as for example, silver-copper, nickel-copper and nickel-chromium alloys; passivated iron alloys such as the non-staining steels are also suitable for use as tanks. We have obtained excellent results with tanks made of pure nickel. In the case of tanks lined with a resistant pure metal a satisfactory lining may often be produced by electro-plating the interior. For example, copper tanks may be plated internally with silver, nickel, gold or platinum of a sufficient thickness to prevent chemical attack on the copper.

In using these tanks for the manufacture of the salts according to the process hereinbefore described the alkali metal hydroxide is dissolved in hot water in the tank and the appropriate platinum salt is added in a solid form or in a concentrated aqueous solution, thus reversing the procedure indicated.

What we claim is:—

1. A readily water-soluble crystalline alkali metal hexahydroxyplatinate having the chemical formula $M_2Pt(OH)_6 \cdot xH_2O$, where M is a metal of the alkali group and $x$ is at least 0.5.

2. A readily water-soluble crystalline alkali metal hexahydroxyplatinate having the chemical formula $M_2Pt(OH)_6 \cdot xH_2O$, where M is a metal of the alkali group and $x$ is 3.

3. A readily water-soluble crystalline alkali metal hexahydroxylplatinate containing water of crystallization which is lost by heating at 100° to 105° centigrade.

4. Sodium hexahydroxyplatinate in the form of fine crystals containing water of crystallization corresponding with the chemical formula $Na_2Pt(OH)_6 \cdot xH_2O$, where $x$ is at least 0.5.

5. Sodium hexahydroxyplatinate in the form of fine crystals containing water of crystallization corresponding with the chemical formula $Na_2Pt(OH)_6 \cdot xH_2O$, where $x$ is 3.

6. Potassium hexahydroxyplatinate in the form of fine crystals containing water of crystallization corresponding with the chemical formula $K_2Pt(OH)_6 \cdot xH_2O$, where $x$ is at least 0.5.

7. Potassium hexahydroxyplatinate in the form of fine crystals containing water of crystallization corresponding with the chemical formula $K_2Pt(OH)_6 \cdot xH_2O$, where $x$ is 3.

8. The process of manufacturing alkali metal hexahydroxyplatinates which comprises boiling a soluble salt of tetravalent platinum, which is free from cyanide, nitrite, and ammonia groups, with an alkali metal hydroxide solution, cooling, and adding an organic liquid miscible with water but without solvent action on the platinate and selected from the group consisting of aliphatic alcohols, ketones, and glycols.

9. The process of manufacturing sodium hexahydroxyplatinate which comprises boiling a soluble salt of tetravalent platinum, which is free from cyanide, nitrite, and ammonia groups, with sodium hydroxide solution, cooling, and adding an organic liquid miscible with water but without solvent action on the platinate and selected from the groups consisting of aliphatic alcohols, ketones, and glycols.

10. The process of manufacturing potassium hexahydroxyplatinate which comprises boiling a soluble salt of tetravalent platinum, which is free from cyanide, nitrite, and ammonia groups, with potassium hydroxide solution, cooling, and adding an organic liquid miscible with water but without solvent action on the platinate and selected from the group consisting of aliphatic alcohols, ketones, and glycols.

11. The process of manufacturing alkali metal hexahydroxyplatinates which comprises boiling a soluble salt of tetravalent platinum, which is free from cyanide, nitrite, and ammonia groups, with an alkali metal hydroxide solution, cooling and adding an aliphatic alcohol selected from the group consisting of ethanol and methanol.

12. The process of manufacuring alkali metal hexahydroxyplatinates which comprises boiling a soluble salt of tetravalent platinum, which is free from cyanide, nitrite, and ammonia groups, with an alkali metal hydroxide, cooling and adding acetone.

13. The process of manufacturing alkali metal hexahydroxyplatinates which comprises boiling a soluble salt of tetravalent platinum, which is free from cyanide, nitrite, and ammonia groups, with an alkali metal hydroxide, cooling and adding methanol.

14. The process of manufacturing alkali metal hexahydroxyplatinates which comprises boiling a soluble salt of tetravalent platinum, which is free from cyanide, nitrite, and ammonia groups, with an alkali metal hydroxide, cooling and adding ethylene glycol.

15. The process of manufacturing alkali metal hexahydroxykalatinates free from contamination with silica compounds which comprises boiling a soluble salt of tetravalent platinum, which is free from cyanide, nitrite, and ammonia groups, with an alkali metal hydroxide in a metal tank, cooling, and adding an organic liquid miscible with water but without solvent action on the platinate and selected from the group consisting of aliphatic alcohols, ketones, and glycols.

16. The process of manufacturing sodium hexahydroxyplatinate free from contamination with silica compounds which comprises boiling a soluble salt of tetravalent platinum, which is free from cyanide, nitrite, and ammonia groups with sodium hydroxide in a metal tank, cooling and adding an organic liquid miscible with water but without solvent action on the platinate and selected from the group consisting of aliphatic alcohols, ketones, and glycols.

17. The process of manufacturing potassium hexahydroxyplatinate free from contamination with silica compounds which comprises boiling a soluble salt of tetravalent platinum, which is free from cyanide, nitrite, and ammonia groups with potassium hydroxide in a metal tank, cooling and adding an organic liquid miscible with water but without solvent action on the platinate and selected from the group consisting of aliphatic alcohols, ketones, and glycols.

18. The process of manufacturing alkali metal hexahydroxyplatinates free from contamination with silica compounds which comprises boiling a soluble salt of tetravalent platinum, which is free from cyanide, nitrite, and ammonia groups, with an alkali metal hydroxide in a metal tank, cooling and adding an aliphatic alcohol selected from the group consisting of ethanol and methanol.

19. The process of manufacturing alkali metal hexahydroxyplatinates free from contamination with silica compounds which comprises boiling a soluble salt of tetravalent platinum, which is free from cyanide, nitrite, and ammonia groups, with an alkali metal hydroxide in a metal tank, cooling and adding acetone.

20. The process of manufacturing alkali metal hexahydroxyplatinates free from contamination with silica compounds which comprises boiling a soluble salt of tetravalent platinum, which is free from cyanide, nitrite, and ammonia groups, with an alkali metal hydroxide in a metal tank, cooling and adding methanol.

21. The process of manufacturing alkali metal hexyhydroxyplatinates free from contamination with silica compounds which comprises boiling a soluble salt of tetravalent platinum, which is free from cyanide, nitrite, and ammonia groups, with an alkali metal hydroxide in a metal tank, cooling and adding ethylene glycol.

In testimony whereof we have signed our names to this specification at London, England, this 14th day of July, 1932.

ALAN RICHARD POWELL.
EMYR CONWY DAVIES.
ARTHUR WILLIAM SCOTT.